United States Patent [19]

Fischle et al.

[11] Patent Number: 5,597,215
[45] Date of Patent: Jan. 28, 1997

[54] METHOD FOR INCREASING DRIVE TORQUE WITH CONTROLLED BRAKE ENGAGEMENT

[75] Inventors: Gerhard Fischle, Esslingen; Matthias Baumann, Boeblingen; Ralph Klingel, Wimsheim; Thomas Mieslinger, Iggingen; Carola Pfister, Plodingun, all of Germany

[73] Assignee: Mercedes-Benz AG, Germany

[21] Appl. No.: 452,994

[22] Filed: May 30, 1995

[30] Foreign Application Priority Data

May 28, 1994 [DE] Germany .......................... 44 18 773.4

[51] Int. Cl.$^6$ .................................................. B60T 8/34
[52] U.S. Cl. ..................... 303/139; 180/197; 364/426.03
[58] Field of Search ..................................... 303/139, 140, 303/141, 142, 143, 144, 145, 188, 186, 190; 180/197; 364/426.03

[56] References Cited

U.S. PATENT DOCUMENTS

| | | | |
|---|---|---|---|
| 3,893,535 | 7/1975 | Burckhardt et al. ................. | 303/139 X |
| 3,981,545 | 9/1976 | Eddy ........................................ | 303/139 |
| 4,589,511 | 5/1986 | Leiber ..................................... | 180/197 |
| 4,926,333 | 5/1990 | Hashiguchi et al. ................. | 303/139 X |
| 5,224,044 | 6/1993 | Tamura et al. ....................... | 180/197 X |
| 5,407,023 | 4/1995 | Yashashita et al. ................. | 180/197 |

FOREIGN PATENT DOCUMENTS

| | | |
|---|---|---|
| 4130370A1 | 3/1992 | Germany . |
| 4230295A1 | 3/1994 | Germany . |
| 4327491A1 | 2/1995 | Germany . |
| 1575762 | 9/1980 | United Kingdom . |
| 2181502 | 4/1987 | United Kingdom . |

*Primary Examiner*—Lee W. Young
*Attorney, Agent, or Firm*—Evenson, McKeown, Edwards & Lenahan P.L.L.C.

[57] ABSTRACT

A method for increasing the drive torque achieves the action of a differential lock in that controlled brake engagement takes place on one side of a driven axle provided that there is a speed difference between the wheels on the different sides of a driven vehicle axle which exceeds a threshold value. The regulation engagement is started even when there are only small speed differences between the wheels on the two sides of the driven axle. A reference velocity of the vehicle is determined and, on the basis of the determined reference velocity, wheel calibration and cornering correction take place, and thereafter, the speed difference is determined therefrom. The speed difference thus determined is substantially based on the difference in the adhesion on both sides of this axle.

23 Claims, 2 Drawing Sheets

METHOD FOR INCREASING DRIVE TORQUE WITH CONTROLLED BRAKE ENGAGEMENT

CROSS-REFERENCE TO RELATED APPLICATIONS

This application is related to application Ser. No. 08/453,002 filed May 20, 1995, for "MOTOR VEHICLE TRACTION SYSTEM CONTROL OSCILLATION DAMPING METHOD USING LOW-ADHESION WHEEL BRAKE INTERVENTION" in the name of Gerhard FISCHLE et al.; application Ser. No. 08/449,660 filed May 24, 1995, for "PROCEDURE FOR CALIBRATION THE WHEEL SPEEDS FOR A MOTOR VEHICLE" in the name of Matthias BAUMANN et al. and application Ser. No. 08/453,002, filed May 30, 1995, for "METHOD FOR CONTROLLING VEHICLE BRAKE PRESSURE AS A FUNCTION OF THE DEVIATION OF THE ACTUAL SLIP OF WHEELS RELATIVE TO A DESIRED SLIP" in the name of Peter BÖSCH et al.

BACKGROUND AND SUMMARY OF THE INVENTION

The present invention relates to an improvement in a method for increasing drive torque with wheel speeds being detected at least on the driven wheels, a differential being arranged on each driven axle to compensate for a speed difference between wheels on one vehicle side and wheels on the other vehicle side of this axle, a braking torque being produced, when a cut-in threshold value for the speed difference is exceeded, on the wheels on one vehicle side of the driven axle which have a higher wheel speed, and the braking torque being regulated as a function of the speed difference.

The periodical Auto Motor Sport, 16/86 of Feb. 8, 1986, pages 34ff, describes the action of a differential lock in that controlled brake engagement takes place on one side of a driven axle provided that there is a speed difference between the wheels on the different sides of a driven vehicle axle. Only the speed difference between the wheels on the left and right vehicle sides of a driven axle is taken into account. It is not possible to compare the speeds with each other and derive different driving conditions. The triggering threshold must, for example in order to exhibit cornering tolerance, allow a large speed difference before the regulated brake engagement is implemented.

An object of the present invention is to improve a drive-torque-increasing method in that the triggering threshold decreases, and therefore the regulation engagement can take place, even when the speed differences between the wheels on the two sides of the driven axle are small.

This object has been achieved according to the method of the present invention by subjecting the determined wheel speeds of the wheels of driven axles to a correction on the basis of a wheel calibration and to a correction on the basis of cornering detection, determining the speed difference of the wheels of a driven axle on the basis of values of the wheel speeds obtained by the wheel calibration and the cornering correction, and determining a reference velocity representing the velocity of the vehicle, with the braking torque being produced only when the wheel velocities corresponding to the wheel speeds are larger than the reference velocity on both sides of the driven axle.

On the basis of the fact that a reference velocity representing the vehicle velocity is determined, a value for the slip of the wheel, for which a measured value of the wheel speed exists, can be calculated. A calibration of the wheel speeds can as a result also then take place. By virtue of the calibration of the wheel speeds, the differences in the wheel speed which arise on the basis of a mutual difference in the rolling circumference of the wheels can be computer-compensated. A wheel calibration which can be applied in the case of the method according to the present invention is described in unpublished DE 43 27 491 A1 (see corresponding above cross-referenced U.S. patent application "PROCEDURE FOR CALIBRATING THE WHEEL SPEEDS FOR A MOTOR VEHICLE" which is incorporated by reference herein) of applicants' assignee and in this respect explicit reference is made thereto.

Cornering correction takes place in a further step. The speed difference of the wheels on the basis of the different cornering radius of the wheels on the two vehicle sides is determined from the reference velocity and from the wheel speeds as well as from the geometrical conditions of the vehicle. It can, for example, further be assumed that the vehicle fulfills the Ackermann conditions during cornering. This assumption then gives the ratios of the wheel speeds as a function of the geometrical conditions of the vehicle.

After the wheel calibration and the cornering correction for the wheels on both sides of a driven axle have been completed, the speed difference is determined therefrom. The speed difference thus determined is substantially based on the difference in the adhesion on the two sides of this axle. It is therefore possible to feed brake pressure into the wheel brake cylinder and therefore to produce a braking torque on the side at which the larger wheel speed is established even when the speed difference is small. The braking torque thus produced produces the same effect as the partial blocking of the differential.

The wheel speeds of non-driven wheels and the wheel speeds of driven wheels are generally used for forming the reference velocity. Methods for determining a reference velocity are known in various ways, for example in the case of anti-lock systems. A method for determining a reference velocity and for determining the cornering-dependent wheel speeds is described in above cross-referenced U.S. patent application "METHOD FOR CONTROLLING VEHICLE BRAKE PRESSURE AS A FUNCTION OF THE DEVIATION OF THE ACTUAL SLIP OF WHEELS RELATIVE TO A DESIRED SLIP", incorporated by reference herein of applicants' assignee and in this respect explicit reference is made thereto.

According to a further aspect of the invention, the engine speed is advantageously taken into account when determining the braking torque to be produced. If the engine speed data is not available, then sufficiently accurately conclusions regarding the engine speed can be drawn with the aid of the average driving-axle velocity. In this situation, the first gear of the manual gearbox is assumed to be selected with the effect that stalling of the engine due to the regulation engagement is avoided even when the driver requires only low engine power, contrary to what is still the case in known systems.

Thus, brake-pressure production is, on one hand, suppressed at low engine speeds or at low driving-axle velocity, and, on the other hand, a limited speed difference between the wheels on the two sides of a driven axle can intentionally be tolerated. This results from an auxiliary value which is added to the cut-in threshold, ES, being determined as a function of the engine speed and of the brake pressure produced. The cut-in threshold increased by the auxiliary value then forms the basis of the brake-pressure regulation.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
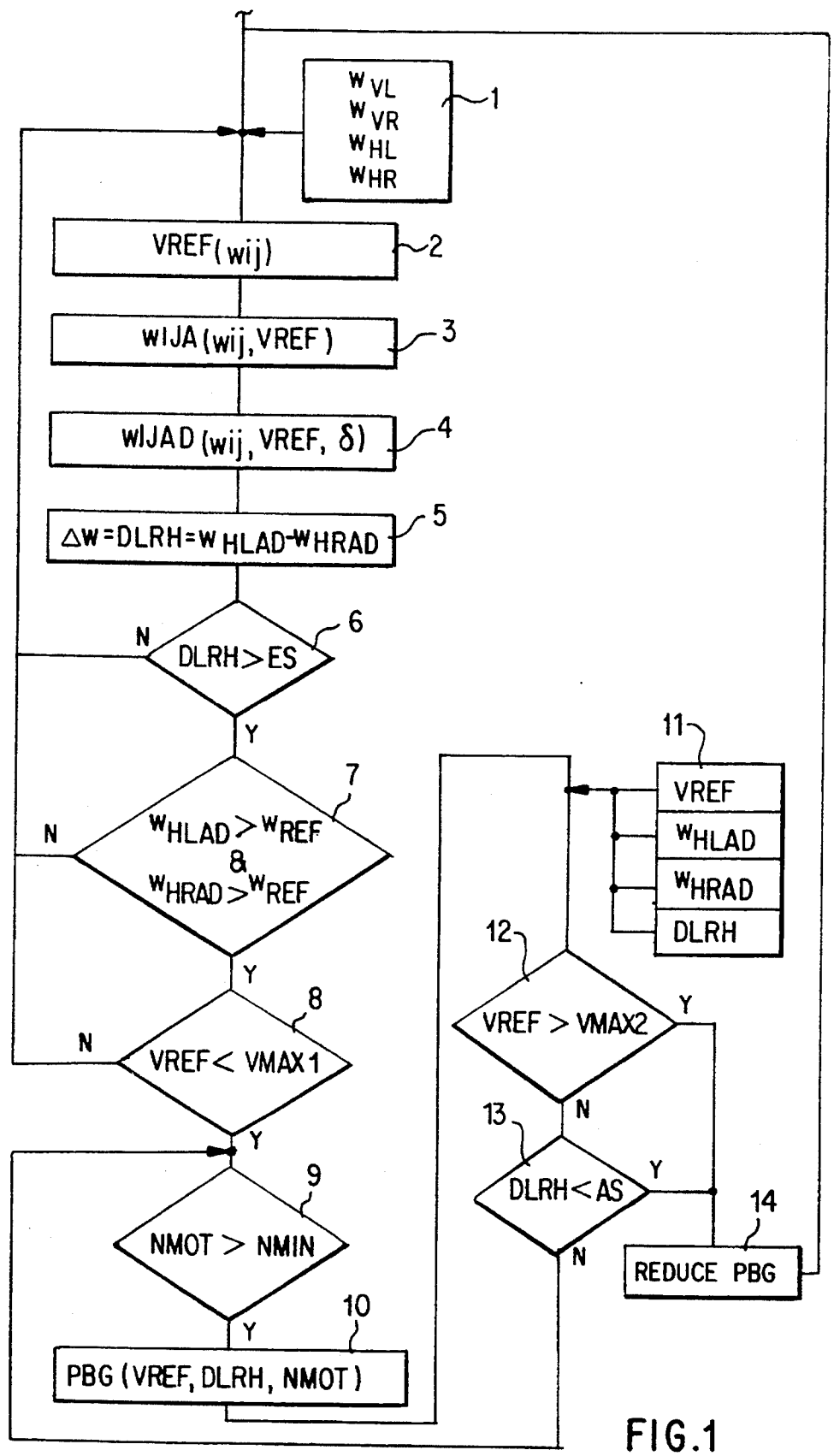
FIG. 1 is a flow chart for the execution of a method according to the present invention.

The flow chart in FIG. 1 is based on a vehicle having a driven rear axle and, in each case, a braked wheel on each side of the rear axle constructed in a generally known manner. Steps 1 to 5 are used for determining the speed difference, DLRH, between the two driven wheels of the rear axle. The letter "w" stands for speed, the indices or subscripts v, h, l and r stand for front, rear, left and right, the index or subscript, a, stands for wheel calibration and the index or subscript, d, stands for cornering correction.

In Step 1, the measured wheel speeds $w_{vr}$, $w_{vl}$, $w_{hr}$, $w_{hl}$ are fed to the slip control. In Step 2, the reference velocity, $v_{ref}$, is determined from these measured wheel speeds. In Step 3, the wheel calibration is carried out. That is, the wheel speeds $w_{vra}$, $w_{vla}$, $w_{hra}$, $w_{hla}$ are corrected by the wheel calibration from the measured wheel speeds $w_{vr}$, $w_{vl}$, $w_{hr}$, $w_{hl}$. According to Step 4, the cornering correction for these corrected wheel speeds is determined; the cornering-corrected wheel speeds $w_{vrad}$, $w_{vlad}$, $w_{hrad}$, $w_{hlad}$ are then calculated therefrom. In Step 5 the speed difference DLRH $$DLRH = w_{hrad} - w_{hlad}$$

is determined from the speeds determined for the driven rear axle.

Steps 6 to 8 are used for testing whether the preconditions for carrying out the unilateral brake engagement on the rear axle are satisfied. In Step 6, a test is carried out as to whether the speed difference is larger than the cut-in threshold ES. The cut-in threshold can in this case assume values of 4 km/h and above. The test takes place with the magnitude of the speed difference, with the sign of the value specifying only the vehicle side requiring engagement. If, for example, the sign speed difference, DLRH, is negative, then engagement is required at the left vehicle side, and if it is positive, then engagement is required at the right vehicle side. In Step 7, a test is carried out as to whether the wheel speeds $w_{hlad}$, $w_{hrad}$, are larger than a wheel speed $w_{ref}$ corresponding to the reference velocity ($w_{ref} = v_{ref}/R$, R being the radius of the wheel). In Step 8, a test is carried out as to whether the reference velocity, $v_{ref}$, is smaller than the velocity threshold, $v_{max1}$, of approximately 40 km/h. If one of these conditions is not satisfied, then the process returns to Step 1. If all conditions are satisfied, then brake-pressure regulation for producing a braking torque can be implemented.

In Step 9, a test is first carried out as to whether the engine speed, $n_{mot}$, exceeds a minimum rotational speed, $n_{min}$. This step is necessary only in the case of vehicles having a manual gearbox and is used to prevent engine stalling. Instead of the engine speed, $n_{mot}$, the rear axle velocity can also be used, for which a minimum value is predetermined as a function of the brake pressure produced.

In Step 10, the necessary brake-pressure gradient, PBG, is determined. The brake-pressure gradient, PBG, is in this illustration determined as a function of various quantities and at least as a function of the speed difference DLRH. Further quantities which may be used are, for example, the reference velocity, $v_{ref}$, and the engine speed, $n_{mot}$. The brake-pressure gradient, PBG, is then supplied to a conventional type of control unit which then drives a known hydraulic unit such that the brake pressure, PB, is produced in the brake cylinder of the corresponding wheel in an otherwise known manner.

Steps 11 to 13 are used for testing whether the regulation can be terminated or whether it is to be continued. In Step 11, current values of the reference velocity, at least of the speeds of the driven wheels $w_{hlad}$, $w_{hrad}$ and the speed difference DLRH are fed to the slip control. According to Step 12, a test is carried out as to whether the reference velocity, $v_{ref}$, exceeds a velocity threshold value, $v_{max2}$, of the order of 80 km/h. If this is the case, the regulation is terminated by jumping to Step 14.

Otherwise, in Step 13, a test is carried out as to whether the speed difference DLRH has fallen below the cut-out threshold AS. If this is not the case, then the process returns to Step 10 and a new value of the brake-pressure gradient to be set is determined. If the value is less than the cut-out threshold, AS, then the process goes to Step 14.

At Step 14, the regulation is terminated. For this purpose, the brake pressure is progressively decreased under the control of the control unit. Care should be taken here that the changes in the driving behavior of the vehicle, due to the brake-pressure reduction, must constantly be capable of being controlled by the driver.

Figure 2:
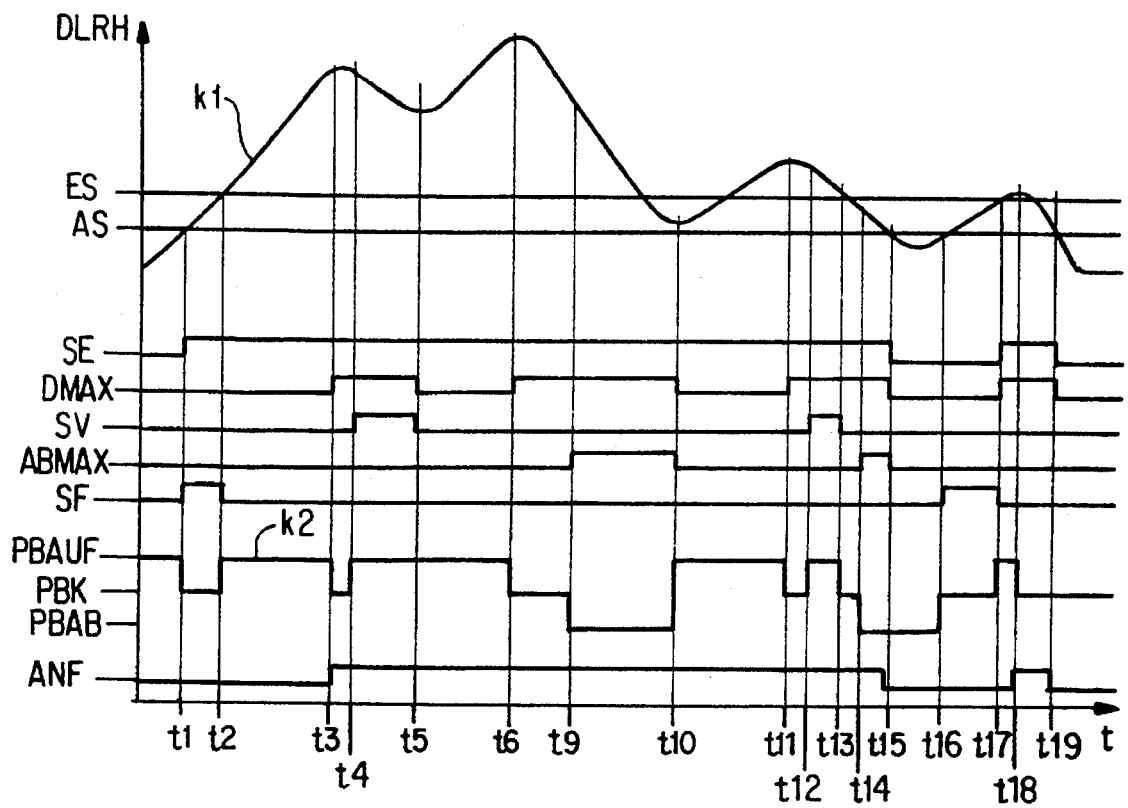
FIG. 2 shows a diagram of the time profile of the method for a specific time sequence of the speed difference between the two vehicle sides.

FIG. 2 shows the time profile of a regulation as a function of an assumed profile of the speed difference. The difference, DLRH, in the wheel speeds which have been subjected to the wheel calibration and the cornering correction, is plotted as the curve k1. The speed difference is in this case given as a velocity difference in km/h. It is, of course, possible to convert between angular speed and velocity using a predetermined tire diameter or using a tire diameter determined in the wheel calibration. The threshold values of the cut-in threshold ES, for example 4 km/h, and of the cut-off threshold AS, for example 2 km/h, are likewise entered in the speed profile.

The switching state, k2, represents the profile of the switching position of control valves in the brake circuit which allow the switching states of pressure increase, PBAUF, pressure holding, PBK, and pressure decrease, PBAB. A braking torque is produced by increasing the brake pressure in the wheel brake cylinder on the vehicle side having the higher wheel speed. Pressure increase and pressure decrease take place in the wheel brake cylinder by control units such as PID control units, and are therefore per se control circuits subordinate to the described regulation.

Before the instant, t1, the state of the brake system is such that brake pressure at the wheel brake cylinders can be increased. This is required so that, in normal driving operation, brake application can take place without resort to a hydraulic unit. The switching state, k2, is therefore in the pressure increase state, PBAUF.

At the instant, t1, the speed difference DLRH exceeds the cut-out threshold, AS. In preparation for a regulation engagement, the signal "suspend pressure decrease", Sf, is set. The switching state, k2, changes from pressure increase, PBAUF, to pressure holding, PBK.

At instant, t2, the speed difference, DLRH, exceeds the cut-in threshold, ES. The start of the regulation is implemented with the change of the cut-in signal, SE, from "0" to "1". The switching state, k2, changes from PBK to PBAUF, and the hydraulic unit comprising at least of solenoid valves, precharging pump and return pump is activated to produce the desired braking torque in the wheel brake cylinder which is arranged on the spinning driven wheel. The brake pressure gradient, PBG, actually predetermined is here defined by a subordinate control unit, for example, a PID control unit.

At instant, t3, it is established that the speed difference, DLRH, has reached a maximum. The signal, DMAX, is set. The hitherto increased brake pressure and therefore the braking torque produced is held constant because the switching state, k2, is set from pressure increase, PBAUF, to pressure holding, PBK. In the case of a short minimum holding time, e.g., approximately 500 ms, a test is carried out as to whether the brake pressure produced is sufficient to reduce the slip. At instant, t4, it is established that the speed difference, DLRH, is still too large. This can happen, for example, by analyzing the speed difference and the time derivative of the speed difference, as soon as it has been established that the speed difference exceeds a maximum. If the speed difference is large and the time derivative is too small, then it is concluded that the braking torque produced is not yet sufficient. A slip signal, SV, is set and the switching state is again set to pressure increase, PBAUF. The slip signal, SV, is in this case held for a holding time of at least 500 ms, as a result of which the switching state, k2, is fixed for at least such a period of time. The brake-pressure regulation is simultaneously activated by the engine speed by setting the signal, MOT.

At instant, t5, the speed difference reaches a minimum. As a result, the signal, DMAX, is set and, consequently, the slip signal, SV, is also reset.

At instant, t6, a maximum speed difference, DLRH, is again detected. The signal, DMAX, is set, and the switching state, k2, changes to pressure holding, PBK.

At instant, t9, the time derivative (with regard to its magnitude) is large enough for an excessive decrease in the speed difference, DLRH, to be established. A signal, ABMAX, is set. The state, k2, is thus switched to pressure decrease, PBAB.

At instant, t10, the speed difference, DLRH, reaches a minimum. The signals, ABMAX and DMAX, are reset, and the switching state, k2, is switched to pressure increase, PBAUF. The switching processes at instants t10 to t14 correspond to the switching processes t6 to t9.

At instant, t15, it is established that the speed difference, DLRH, has fallen below the cut-off threshold, AS. All set signals, i.e. the signals, ANF, ABMAX, DMAX and SE, are then reset. The drive regulation has reduced the speed difference to such an extent that the regulation termination is initiated. The state, k2, is, provided that this is not yet the case, switched to pressure decrease, PBAB. The pressure decrease is controlled by a subordinate control unit and takes place slowly enough to guarantee that the driver does not lose control of the vehicle. In this case, it must be taken into account that in order to compensate for the yaw torque resulting from the unilateral brake engagement, the driver must employ a not inconsiderable steering action, in order for the desired driving direction to be retained.

The instant, t16, corresponds to instant, t1. It is established that the speed difference DLRH exceeds the cut-off threshold AS. The brake-pressure decrease is interrupted by setting the switching state, k2, to pressure holding, PBK. At instant, t17, the cut-in threshold, ES, is exceeded by the speed difference, DLRH, and the regulation is reactivated by setting the cut-in signal, SE. The switching state changes to pressure increase, PBAUF. The signal, DMAX, is set at instant, t18, the pressure increase, PBAUF, is terminated and the switching state pressure holding, PBK is adopted.

Similarly, the brake-pressure regulation is activated by the starting control unit using the signal, ANF, which is set. At instant, t19, the speed difference, DLRH, has fallen below the cut-off threshold, AS. All activated signals, i.e. ANF, DMAX and SE, are reset. The regulation termination is initiated, and the switching state, k2, is changed over to the pressure decrease position, PBAB. The increased brake pressure and therefore the braking torque produced are decreased by the subordinate control unit. If the brake-pressure decrease is terminated, then the switching state, k2, is changed back to the position pressure increase, PBAUF. The hydraulic unit is decoupled from the brake circuit, and normal brake application can be carried out.

Figure 3:
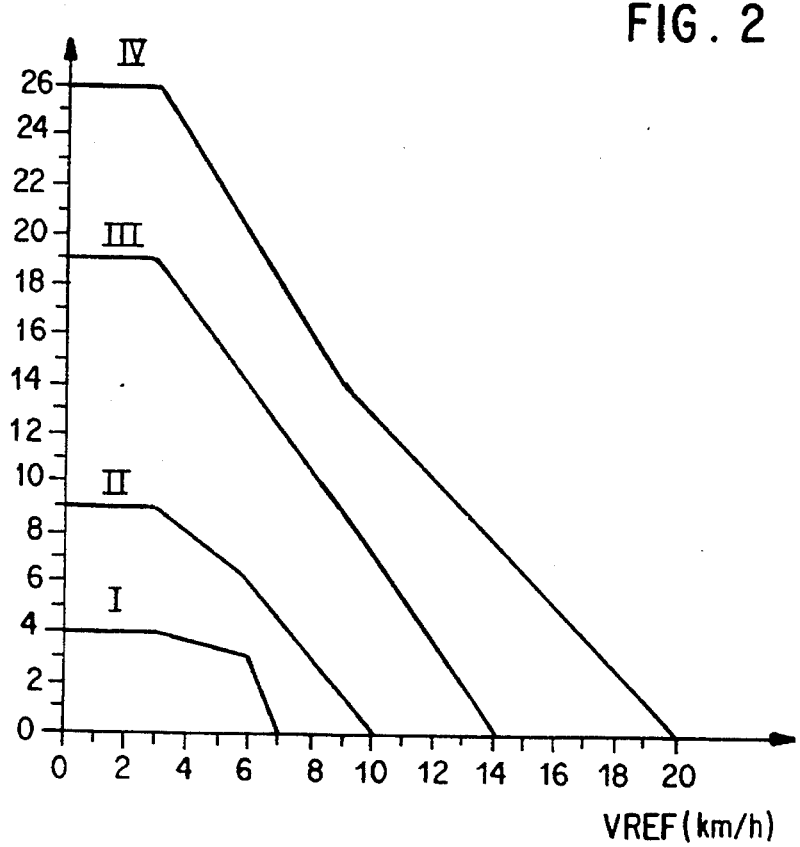
FIG. 3 is a graph of performance data for determining an auxiliary value.

FIG. 3 shows performance data for the auxiliary value, ZUS, which is specified as a function of the reference velocity, $V_{ref}$ which is a measure for a nominal value of the drive axle velocity and therefore also a measure for a nominal value of the engine speed, because the gearbox ratio is known and the 1st gear is assumed to be the selected gear.

The given characteristic curves in FIG. 3 for various brake pressures, PB, are established for a specified engine power. The same characteristic curves are assigned to higher brake pressures, PB, in the case of a more powerful engine, and to lower brake pressures, PB, in the case of a less powerful engine. Intermediate values can be calculated by interpolation.

The auxiliary value, ZUS, is determined as a function of the reference velocity, $v_{ref}$, and, if the signal, ANF, is set, is added to the cut-in threshold ES. As a result of this addition, an increase of the brake pressure is allowed only at higher speed differences, DLRH. The drive axle velocity rises and, as a result thereof, a higher engine torque can be set by the rise in the engine speed. The auxiliary value does not influence the start of the regulation, because the signal, ANF, can only be set if the cut-in threshold, ES, has been satisfied beforehand and the regulation has already been initiated. The auxiliary threshold alters the regulation engagement because the difference, employed as regulation quantity, between the speed difference, DLRH, and the cut-in threshold, ES, is decreased by the auxiliary value, ZUS.

The characteristic curves represented are in each case assigned to a range of brake pressures. The assignment to brake pressures, PB, and the profile of the characteristic curves are in this case defined by taking into account the brake system used and the power characteristics of the engine obtained, for example, in driving tests. The characteristic curve I in FIG. 3, for example, is used below a brake pressure of, say, 20 bar. Between 20 and 65 bar of brake pressure, PB, characteristic curve II is used; between 65 and 85 bar, characteristic curve III is used; and above 85 bar, characteristic curve IV is used. The characteristic curves are in this case selected such that an approximately constant engine speed, $n_{mot}$, results during a regulation.

When characteristic curve IV is used, the cut-in threshold, ES, is increased by an auxiliary value, ZUS, at most up to a reference velocity of 20 km/h. Above this velocity, the auxiliary value is zero, i.e. ZUS=0. The fact that stalling of the engine is no longer possible at higher velocities is thereby taken into account.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for increasing drive torque of a motor vehicle, comprising the steps of
   (a) measuring wheel speeds of at least driven axle wheels;
   (b) subjecting the measured wheel speeds of the wheels of each driven axle to a wheel calibration correction and a cornering detection correction;
   (c) determining a speed difference of the wheels of each driven axle as a function of values of the wheel speeds obtained by the wheel calibration correction and the cornering detection correction;
   (d) compensating the speed difference between wheels on one side of each driven axle and wheels on another side of each driven axle;
   (e) determining a reference velocity representative of vehicle velocity;
   (f) producing a braking torque when a cut-in threshold value for the speed difference is exceeded, on the wheels on the one side of each driven axle which have a higher wheel speed only when the wheel velocities corresponding to the wheel speeds are larger than the reference velocity on both sides of the driven axle; and
   (g) regulating the braking torque as a function of the speed difference.

2. The method according to claim 1, wherein the reference velocity is determined from the measured wheel speeds.

3. The method according to claim 1, wherein, with respect to each driven axle, the wheel slip is determined, from the reference velocity and from the wheel speeds of the wheels on the one vehicle side of the driven axle, for the one vehicle side.

4. The method according to claim 1, wherein the braking torque produced is reduced when the speed difference falls below a cut-off threshold value.

5. The method according to claim 4, wherein the cutoff threshold value is less than a cut-in threshold value.

6. The method according to claim 5, wherein the cut-off threshold value is smaller than the cut-in threshold value by a fixed amount, independently of the vehicle velocity.

7. The method according to claim 1, wherein the braking torque produced is reduced whenever the reference velocity exceeds a velocity limit value.

8. The method according to claim 1, wherein the braking torque is produced only when the reference velocity at the instant of fulfilling criteria for producing the braking torque, has not exceeded a reference velocity value.

9. The method according to claim 8, wherein a velocity threshold value is smaller than a velocity limit value for reducing the braking torque.

10. The method according to claim 1, wherein a maximum for a gradient when reducing the braking torque is predetermined.

11. The method according to claim 10, wherein the maximum of the gradient is a function of the vehicle velocity, and the maximum of the gradient is reduced when the reference velocity in increased.

12. The method according to claim 1, wherein the braking torque is reduced whenever a brake pedal is actuated.

13. The method according to claim 12, wherein the braking torque is reduced with a maximum possible gradient.

14. The method according to claim 13, wherein the braking torque is reduced whenever brake-pressure regulation is implemented by an anti-lock system.

15. The method according to claim 1, wherein the braking torque is reduced whenever brake-pressure regulation is implemented by an anti-lock system.

16. The method according to claim 1, wherein, with a manual gearbox, engine speed is measured, and the braking torque is produced only when the engine speed exceeds a lower speed limit.

17. The method according to claim 16, wherein the cut-in threshold value is increased whenever, with braking torque being produced, the engine speed falls initially below the lower speed limit.

18. The method according to claim 16, wherein the braking torque is regulated by a subordinate control unit as a function of both the engine speed and a nominal engine speed determined from the reference velocity and a selected gearbox setting.

19. The method according to claim 16, wherein an average driving-axle velocity is determined from the measured wheel speeds on both vehicle sides of a driven axle as representative of the engine speed.

20. The method according to claim 1, wherein braking torque is regulated as a function of the speed difference reduced by an auxiliary value determined from the engine speed and the braking torque produced.

21. The method according to claim 20, wherein the auxiliary value is determined from performance data predetermined as a function of engine power characteristics.

22. The method according to claim 1, wherein a brake pressure is based on braking torque in wheel brake cylinders.

23. The method according to claim 22, wherein a gradient of brake pressure is a function of the braking torque to be produced.

* * * * *